May 9, 1967 J. A. ALICH 3,318,347
METHOD AND APPARATUS FOR MULTIPLE RESAWING
Filed June 19, 1963 3 Sheets-Sheet 2
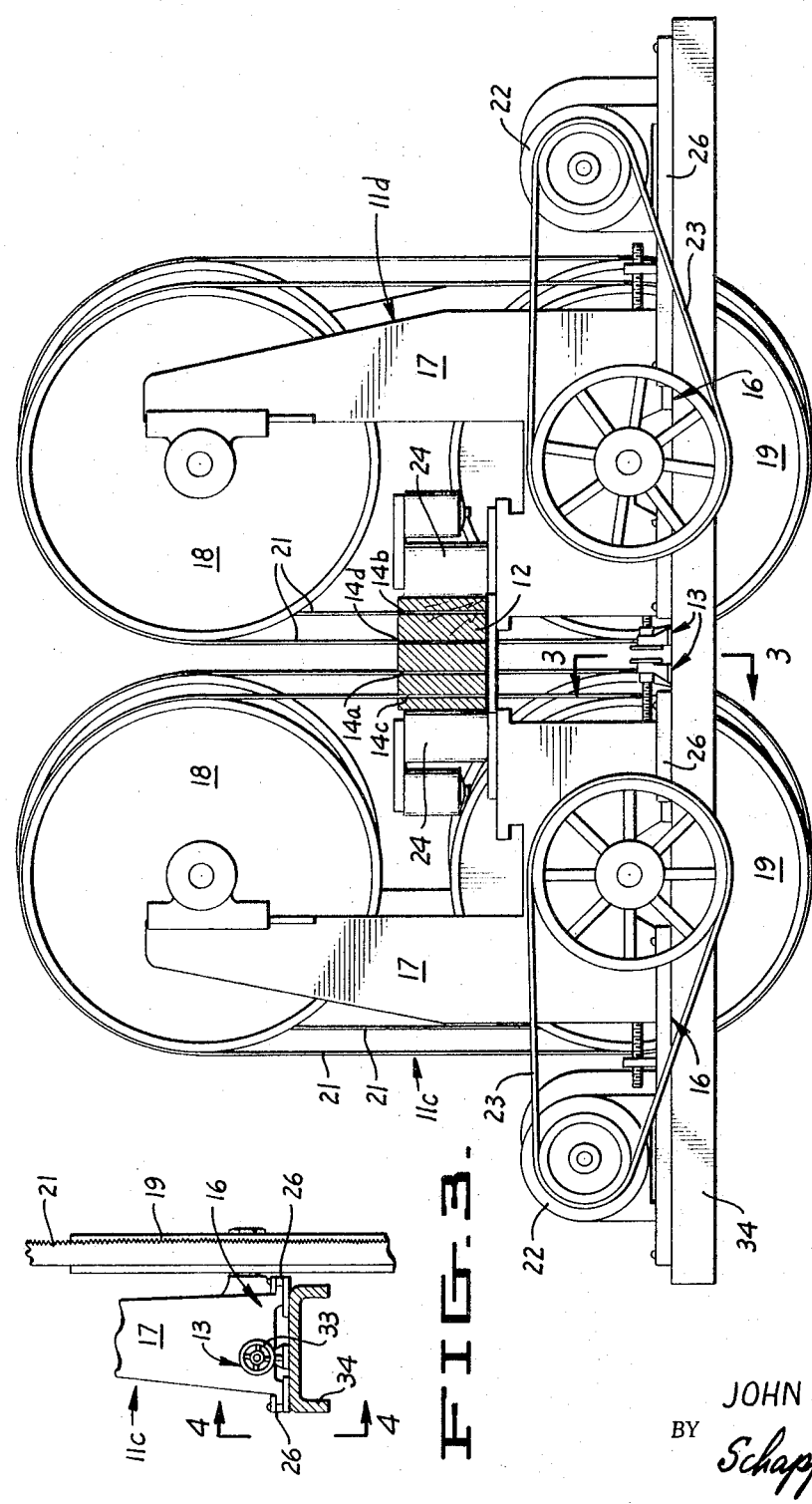
INVENTOR.
JOHN A. ALICH
BY Schapp & Hatch
ATTORNEYS May 9, 1967 J. A. ALICH 3,318,347
METHOD AND APPARATUS FOR MULTIPLE RESAWING
Filed June 19, 1963 3 Sheets-Sheet 3
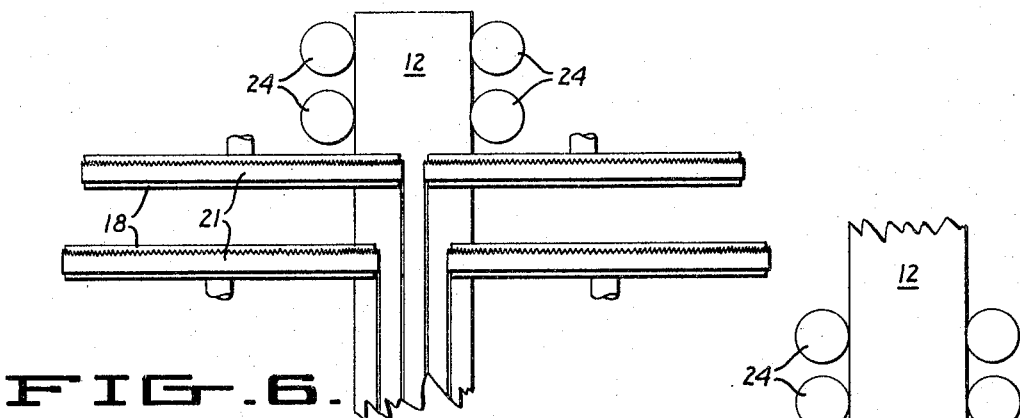
FIG. 6.
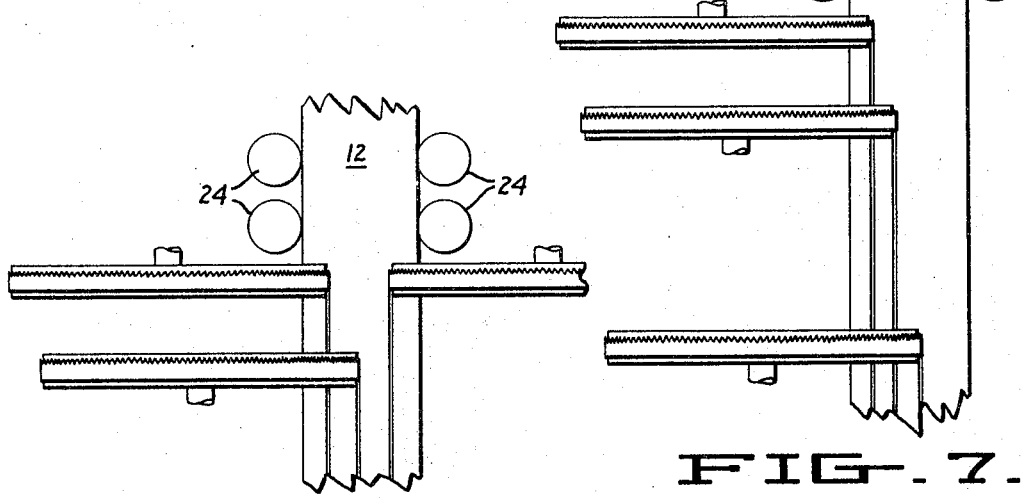
FIG. 7.
FIG. 8.
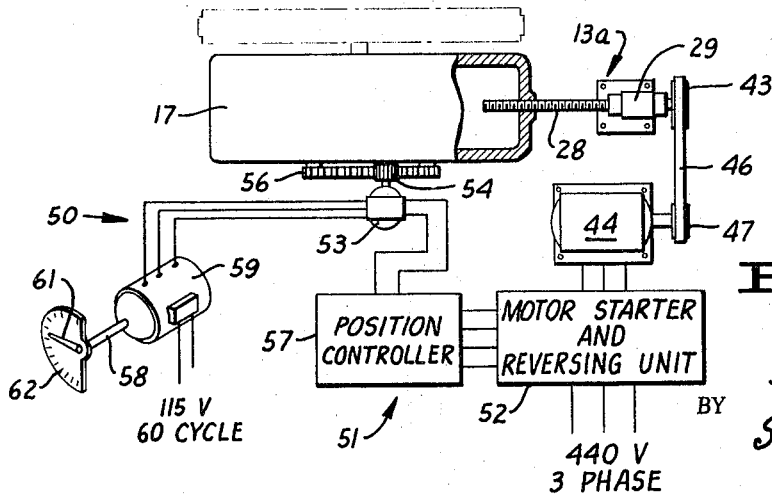
FIG. 9
INVENTOR.
JOHN A. ALICH
BY
Schapp & Hatch
ATTORNEYS United States Patent Office 3,318,347
Patented May 9, 1967

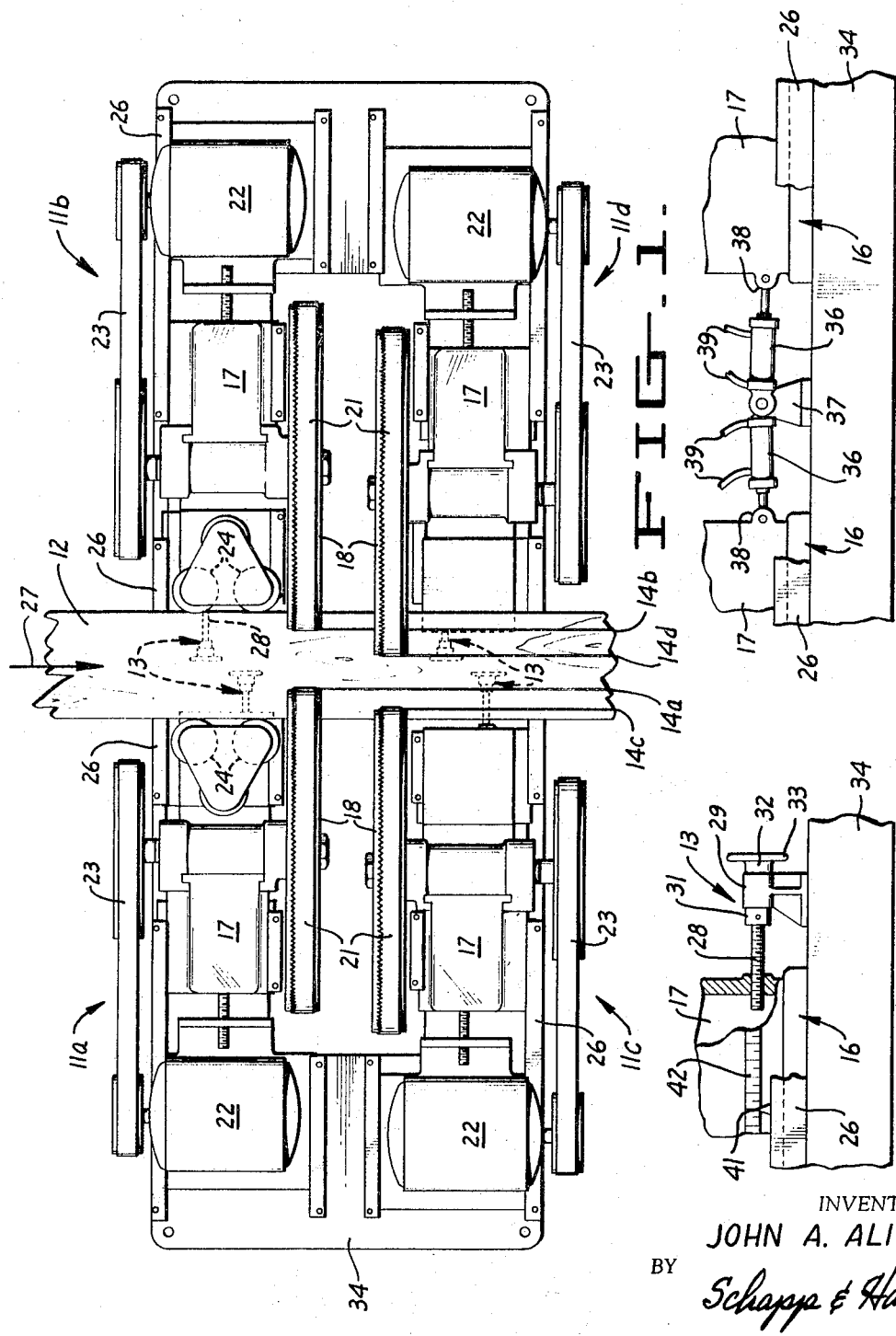

3,318,347
METHOD AND APPARATUS FOR MULTIPLE RESAWING
John A. Alich, Burlingame, Calif., assignor to Turner Machinery Co., Inc., San Francisco, Calif.
Filed June 19, 1963, Ser. No. 289,000
1 Claim. (Cl. 143—22)

This invention relates to improvements in a method and apparatus for multiple resawing and similar operations, and more particularly to multiple resawing involving the making of a number of longitudinal cuts in an elongated workpiece for converting such workpiece into a number of strips of desired size.

As used herein, the term "resaw" is intended to include the sawing of relatively large workpieces of various cross-sectional configurations into smaller and more precisely sized boards and strips, as well as similar operations such as ripping, re-ripping, edging and re-edging. While the present invention is particularly suitable for use in connection with resawing of lumber, it may be used advantageously in connection with other materials such as plastics, compositions and even soft or thin metals.

Previous devices of this general type have relied on displacing the saw blades relative to their associated actuating machinery and this creates wear and strain conditions which have rendered multiple resawing relatively impractical.

The present invention, on the other hand, contemplates a method and apparatus for resawing in which the saw blades and their actuating machinery are provided in discrete units positionable relative to each other in a manner requiring no distortion or undesired displacement of the individual saw blades from their normal positions.

It is therefore a principal object of the present invention to provide a method and apparatus for sawing a plurality of cuts longitudinally through an elongated workpiece, at laterally spaced locations, so as to sever a plurality of strips of desired size from the workpiece in a single pass.

Another object of the invention is to provide an apparatus of the character described in which each cut is made by self-contained bandsaw units and these units are readily positionable relative to each other and to the workpiece so as to orient the cutting areas of the blades in proper postion without disturbing the geometrical relationship of the component parts of the bandsaw unit.

A further object of the present invention is the provision of an apparatus of the character defined in which the various bandsaw units may be arranged in a variety of patterns along the path of the workpiece, as desired, to make use of available space.

A still further object of the invention is to provide an apparatus of the character set forth which is capable of full or partial cutting operations, including resawing, re-resawing, ripping, re-ripping, edging or re-edging of various materials such as plastics, sawable metals and wood pieces including logs, veneer cores, cants, flitches, boards and other configurations.

Another object of the invention is to provide a multiple resaw apparatus in which the various saw cuts may easily and readily be located at laterally spaced positions with reference to an edge of the workpiece or to a chosen zero point or reference line.

Yet another object of the invention is to provide a multiple resaw apparatus having provision for rapidly moving separate bandsaw units to pre-set positions.

Further objects and advantages of my invention will be apparent as the specification progresses, and the new and useful features of my method and apparatus for multiple resawing will be fully defined in the claim attached hereto.

The preferred form of my invention is illustrated in the accompanying drawings forming part of this specification, in which:

FIGURE 1 is a plan view of an apparatus constructed in accordance with the present invention and incorporating four bandsaw units arranged in paired opposed and tandem relation;

FIGURE 2, a front elevation of the apparatus of FIGURE 1;

FIGURE 3, a sectional view taken substantially on the plane of line 3—3 of FIGURE 2;

FIGURE 4, an enlarged sectional view taken substantially on line 4—4 of FIGURE 3 and illustrating a manually operable positioning means;

FIGURE 5, a view taken similarly to that of FIGURE 4 but showing a fluid operated positioning means;

FIGURE 6, a plan schematic view of an apparatus having saw units disposed similar to that of FIGURE 1 but in which the individual bandsaw units are positioned at different lateral spacings for sawing the workpiece into equal width boards;

FIGURE 7, a schematic plan view similar to that of FIGURE 6 but illustrating three bandsaw units disposed in tandem relation along the path of movement of the workpiece;

FIGURE 8, a schematic plan view similar to the view of FIGURES 6 and 7 but illustrating a pair of bandsaw units disposed in opposed relation together with a third bandsaw unit positioned in tandem relation thereto; and FIGURE 9, a schematic view of an electrically operated, remote controlled positioning means and associated circuitry.

While I have shown only the preferred forms of my invention, it should be understood that various changes or modifications may be made within the scope of the claims attached hereto without departing from the spirit of the invention.

Referring to the drawings in detail, and particularly to FIGURE 1, it will be seen that the apparatus of the present invention consists essentially of a plurality of saw units 11a, 11b, 11c and 11d, each of which is adapted for making a cut through an elongated workpiece 12 moving end-first through the apparatus, together with positioning means 13 for moving and adjustably holding each of the saw units in selected laterally spaced relation to the other saw units for making longitudinal cuts 14a, 14b, 14c, 14d through the workpiece at desired lateral spacings.

As an important feature of the present invention, each of the saw units 11 is entirely self-contained and the entire assembly is mounted on a base member 16 for lateral movement as a unit. By "self-contained" it is meant that the saw, the supporting structure and the drive means therefor are all disposed in normal operating relation to each other and are carried in such relation on the base member. In this manner the desired lateral positioning of the cuts may be accomplished without displacing or distorting the saw blade relative to the other components or otherwise disturbing the operating relationship.

While my invention may effectively incorporate various types of self-contained saw units, such as rotating saws and reciprocating saw blade devices, it is particularly suited for use with self-contained bandsaw units of the character illustrated in the drawings. As best shown in FIGURES 1 and 2, the bandsaw units preferably are of conventional construction including a frame 17 mounted on the base member 16 and adapted to journal idler and driven wheels 18 and 19 having a bandsaw blade 21 entrained therearound in a continuous loop, the unit being motivated by an electric motor 22 also carried by the base member 16 and connected by belt drive 23 to the wheel 19.

The saw units may also be provided with the usual blade tensioning devices, drive belt take-ups, and other associated apparatus such as saw guides, shields and the like (not shown). Likewise, the means for feeding the workpiece 12 end-first through the saws may be of any suitable type such as feed rolls, reciprocating carriage, line bar, etc. As shown herein, the feeding means consists of opposed pairs of powered feed rolls 24. These feed rolls have the advantage of being yieldably mounted to accommodate variations in the width of the workpiece and permit indexing of the saw cuts either from an edge of the workpiece or from a desired reference line. A further description of such feed rolls may be found in United States Patent No. 2,661,033 issued to David M. Daniel and assigned to the assignee of this application.

The feed rolls 24 here are supported by the frame 17, of one or both of the saw units 11a and 11b, and frictionally engage the opposite sides of the workpiece 12 so that rotation of the rolls will urge workpiece 12 end-first along a path intersecting the cutting stretches of the saws 21. Of course, the axes of rotation of wheels 18 and 19 and hence blades 21, are parallel to such path in order for the blades 21 to effect the desired longitudinal cuts. While the feed rolls 29 are here shown as being mounted with their axes vertical, it should be apparent that the rolls could be horizontal so as to engage the top and bottom sides of the workpiece.

In accordance with the present invention the saw units 11a, 11b, 11c and 11d are slidably mounted on guideways 26 for lateral movement with respect to the direction of movement of the workpiece 12, indicated by arrow 27. The positioning means 13 is adapted for effecting such lateral movement to the desired position and for holding the saw units in such location until repositioning is desired.

A manually operable positioning means 13 is illustrated in FIGURES 1, 2 and 3 of the drawings. This means consists essentially of a horizontal rod 28 journaled for rotation in a bearing member 29 in parallel relation to the direction of movement of the saw unit. Collars 31 and 32 attached to the rod 28 hold it against axial movement in the bearing 29 while permitting free rotation. The distal end of the rod 28 is threadably engaged through an opening in a confronting portion of the frame 17. Rotation of rod 28 in either direction may be effected by means of hand wheel 33 and such rotation will cause the saw unit to advance toward or move away from the bearing member 29, the latter being fixedly secured to a foundation member 34.

An alternate form of positioning means is illustrated in FIGURE 5 of the drawings and is particularly suitable for use where a source of air or hydraulic fluid under pressure is readily available. The positioning means of FIGURE 5 consists of extendable hydraulic or pneumatic cylinder units 36 connected between a bracket 37, secured to the foundation member 34, and bosses 38 provided on the saw unit frames 17. Flexible hoses 39 connect the cylinders to a source of fluid under pressure through conventional two-way valving (not shown) which provides power operation of either cylinder in either direction as required.

In accordance with the present invention the saw units 11 may be disposed around the path of the workpiece 12 in a variety of patterns so as to accomplish a variety of results. The arrangement illustrated in FIGURE 1 is set up to saw the lumber workpiece 12 into five boards or slabs of different widths. This pattern of saw units may readily be adjusted to saw the workpiece 12 into five boards of equal width as illustrated in FIGURE 6 of the drawings. This flexibility is made possible by the concept of mounting entirely self-contained saw unit, so that the saw cut from any one unit may be any desired amount of lateral displacement of the entire saw unit, so that the saw cut rom any one unit may be made where desired in relation to the other three cuts. This result is unobtainable in multiple resaw apparatus where the saw units are not movable as units.

FIGURE 7 of the drawings illustrates a different pattern in which a pair of saw units corresponding to the units 11a and 11c illustrated in FIGURE 1 are mounted for adjustable lateral positioning on a common base together with a third saw unit positioned in tandem relation to the paired units. In this manner any desired number of saw units may be positioned along the path of the workpiece and hence any desired number of cuts may be made through such workpiece as it passes along the tandem line of saws.

A third possible pattern or set-up is illustrated in FIGURE 8 of the drawings in which saw units corresponding to the saw units 11a and 11c of FIGURE 1 are mounted for adjustable lateral positioning on a common base with a third saw unit, corresponding to unit 11b of FIGURE 1, carried in opposed relation thereto. From FIGURES 6, 7 and 8 and from the foregoing description, it should be apparent that many different patterns of arrangement may be provided within the ambit of the present invention. Moreover, if desired, one or more of the saw units could be tilted on its base so that the cuts made thereby are slanted, or even horizontal.

With the forms of positioning devices illustrated in FIGURES 1 through 5, indexing of the position of the saw cut relative to an edge of the workpiece or to a center line or other reference line may be accomplished by measuring the distance from the cutting stretch of the saw blade to the reference line or by providing suitable alignable indicia on the base members 16 and guideways 26. For example, as seen in FIGURE 4, a pointer 41 may be mounted on the guideway 26 for indicating relative position on a scale 42 secured to the frame 17. Other suitable indexing devices may also be provided.

Under certain conditions it is highly desirable to provide for remote control of the lateral positioning of the saw units to preset positions. A device for effecting such remote control is illustrated in FIGURE 9 of the drawings. As there shown, a positioning means 13a is utilized which is similar in construction to positioning means 13 illustrated in FIGURE 4 of the drawings, the main difference being that the hand wheel 33 is replaced by a pulley 43. The threaded rod 28 of the positioning means 13a is rotated in opposite directions by a reversing electric motor 44 driving through a V-belt 46 entrained around the drive pulley 47 of the motor and the pulley 43.

The direction of rotation and the operating period of the motor 44 are controlled by a position controlling means 51 which includes a switching means 52 adapted for connecting the motor 44 to a three-phase power supply in such manner as to cause the motor to rotate in the desired direction until the saw unit is positioned at a desired location. The switching means 52 is actuated in response to error signals from a position sensing means 50 capable of creating such signals when the position of the saw unit does not correspond to a preselected position. This may be accomplished by a number of known positioning controls incorporating synchronous Selsyn devices or linked potentiometers.

As here shown, the means 50 includes a Selsyn control transformer 53 having a pinion gear 54 engaged with a rack gear 56 secured to the frame 17 of the saw unit being positioned. The error signal from Selsyn control transformer 53 is amplified by a position controller unit 57 and passes therefrom into the switching means 52.

The error signal emanating from Selsyn control transformer 53 is generated in response to field imbalance created when the shaft 58 of a Selsyn generator 59 is rotated from a position in which the fields of the generator 59 and transformer 53 are in balance. A pointer 61 is secured to shaft 58 and cooperates with a fixed scale 62. When it is desired to readjust the lateral positioning of the saw unit, the pointer 61 is moved to the appropriate location on scale 62. This rotates shaft 58, creating an imbalance between the Selsyn generator 59 and control transformer 53. This generates an error signal which is amplified by position controller 57 and serves to actuate the motor starter and reversing unit 52 to connect motor 44 into the three-phase power supply. The motor 44 will then operate to rotate threaded rod 28 and cause the saw unit frame 17 to advance toward or recede away from the bearing member 29.

The rack 56, being attached to frame 17, moves therewith and rotates pinion 54 attached to the shaft of the Selsyn control transformer 53. This movement continues until the Selsyn unit 53 is again in balance with the generator unit 59 at which time the error signal ceases and the unit 52 shuts off the supply of power to motor 44. The Selsyn actuated control circuit described is well known in the art and is manufactured by General Electric Company of Schenectady, New York. A more complete description of the unit and its circuits may be found in General Electric Catalog No. GEI–31257D.

From the foregoing it will be seen that I have provided a novel method and apparatus for multiple resawing in which any desired number of cuts are made by self-contained bandsaw units, arranged in a variety of patterns along the path of the workpiece, so as to accomplish multiple cutting operations in one pass of the workpiece through the apparatus. The apparatus is further provided with novel positioning devices for rapidly and precisely relocating the relative position of the various cuts as required.

I claim:

An apparatus for making multiple cuts lengthwise through an elongated workpiece moving end first through the apparatus, comprising a plurality of saw units, each of said saw units including a saw member and motor drive therefor mounted on a base member; a plurality of positioning means for moving and adjustably holding each of said saw units in laterally spaced relation to the other saw units for making longitudinal cuts through the workpiece at desired lateral spacings; each of said positioning means including a guideway for said base member extending laterally with respect to the path of movement of the workpiece; power-operated means connected to said guideway and base member for displacing said base member along said guideway to a selected position; and indexing means on said guideway and base member formed for holding said base member at the preselected position on said guideway, said indexing means including a reversing electric motor for displacing said saw units, switching means formed for operating said motor in a desired direction of rotation in response to an error signal, and sensing means connected to said saw and switching means and formed for supplying such error signal to the switching means when said saw unit is not located at a preselected position, said sensing means including a Selsyn unit consisting of a generator having provision for displacing its shaft to a selected rotary position and a control transformer linked to the generator so as to generate an error signal when the rotary position of its shaft no longer corresponds with the rotary position of the generator shaft, a pinion gear on the shaft of said control transformer, a rack gear secured to said saw unit and meshed with said pinion gear for rotating the control transformer shaft in accordance with lateral movement of the saw unit, and an amplifier connected between said control transformer and said switching means for amplifying said error signal.

References Cited by the Examiner

UNITED STATES PATENTS

| 922,855 | 5/1909 | Cleveland | 143—22 |
| 2,574,393 | 11/1951 | Hult | 143—120 |
| 2,696,853 | 12/1954 | Balch et al. | 143—120 |

FOREIGN PATENTS

| 101,838 | 11/1925 | Austria. |
| 1,119,392 | 4/1956 | France. |
| 8,821 | 1893 | Great Britain. |
| 4,252 | 6/1893 | Sweden. |

DONALD R. SCHRAN, *Primary Examiner.*